United States Patent [19]
Mimura

[11] Patent Number: 6,053,836
[45] Date of Patent: Apr. 25, 2000

[54] VARIABLE SPEED CHANGE GEAR

[76] Inventor: Kenji Mimura, 29-1105, Wakabadai 4-chome, Asahi-ku, Yokohama-shi, Kanagawa 241-0801, Japan

[21] Appl. No.: 09/313,378

[22] Filed: May 18, 1999

[30] Foreign Application Priority Data

Feb. 9, 1999 [JP] Japan .................................. 11-031424

[51] Int. Cl.⁷ .................................................. F16H 37/12
[52] U.S. Cl. .............................................. 475/218; 74/117
[58] Field of Search .............................. 74/117; 475/207, 475/218, 166, 170

[56] References Cited

U.S. PATENT DOCUMENTS

| | | | |
|---|---|---|---|
| 1,605,886 | 11/1926 | Wolf ........................................... | 74/117 |
| 2,864,259 | 12/1958 | Trolger ...................................... | 74/117 |
| 4,112,778 | 9/1978 | Korosue ..................................... | 74/117 |

FOREIGN PATENT DOCUMENTS

H5-46459  7/1993  Japan .

*Primary Examiner*—Sherry L. Estremsky

*Attorney, Agent, or Firm*—Lowe, Hauptman Gopstein, Gilman & Berner, LLP

[57] ABSTRACT

When second rotating bodies are made eccentric, the second rotating bodies move straight in the radial direction along first rotating bodies. Therefore, the cyclically changing angular velocity of the second rotating body changes so that the side on which the angular velocity is higher than the angular velocity of the input-side rotating body and the side on which the angular velocity is lower are symmetrical to each other. Also, on both of the side on which the angular velocity is higher and the side on which it is lower, the acceleration side and the deceleration side change symmetrically to each other. On the other hand, the angular velocity of the second rotating body such that the movement direction with respect to the first rotating body is shifted 180 degrees with each other with the input-side rotating body being the center changes symmetrically with respect to the angular velocity of the input-side rotating body. Moreover, since the second rotating bodies have the same mass, the radial forces of the second rotating bodies are canceled each other, so that the rotational force always acts with the input-side rotating body being the center.

8 Claims, 11 Drawing Sheets

VARIABLE SPEED CHANGE GEAR

BACKGROUND OF THE INVENTION

1. Field of the Invention

The present invention relates to a variable speed change gear used for various machines requiring transmission of power, such as transportation machines including an automobile.

2. Description of the Related Art

At present, a variable speed change gear used for an automobile generally uses a metallic belt and a pair of pulleys. In the variable speed change gear of this type, the radius of the belt passed around the pulleys is changed to change the speed by continuously changing the groove width of each pulley. However, a structure which transmits power by means of a frictional force between the belt and the pulley has a problem in that the power transmission efficiency is decreased by the slip of belt, so that the whole of equipment must be made large to transmit high power.

To solve this problem, there has been known a variable speed change gear capable of transmitting power efficiently without the use of a belt and pulleys. For this type, a plurality of eccentric rotating bodies is provided between an input shaft and an output shaft disposed coaxially with each other. The eccentric rotating bodies are capable of being eccentric in the radial direction with respect to the input shaft. The rotational force of an eccentric rotating body whose angular velocity is the lowest or the highest in the eccentric rotating bodies rotated by the rotational force of the input shaft side is transmitted to the output shaft side by a one-way clutch, by which the rotation ratio between the input shaft and the output shaft is changed according to the eccentricity of each eccentric rotating body. The variable speed change gear of this type has been disclosed in, for example, Japanese Patent Publication No. 5-46459.

Although various types have been contrived in terms of the power transmitting construction and the shape of the eccentric rotating body for the variable speed change gear constructed as described above, all types have a drawback of easy occurrence of vibrations during its rotation because an eccentric force is applied in the radial direction of the input and output shafts by the eccentric rotation. For this reason, this type can be only used in the case of small size and low rotation in which the effect of vibration can be neglected, and it is difficult to practically use this type because of its large vibration in an application, such as an automobile, which requires large size and high rotation.

SUMMARY OF THE INVENTION

The present invention has been made to solve the above problems, and accordingly an object thereof is to provide a variable speed change gear which can reduce vibrations during its rotation and can be used satisfactorily in an application requiring large size and high rotation.

To achieve the above object, according to a first aspect of the present invention, there is provided a variable speed change gear comprising: an input shaft and an output shaft arranged coaxially with each other; a plurality of first rotating bodies which rotate integrally with the input shaft; a plurality of second rotating bodies having an equal mass, each of which engages with the first rotating body so as to be movable straight in the radial direction, and in which the rotational center can become eccentric in the radial direction with respect to the input shaft; a third rotating body in which the rotational center can become eccentric in the radial direction with respect to the input shaft together with the second rotating bodies; a one-way transmission member for transmitting the rotational force in a predetermined direction of the rotating body whose angular velocity is the highest or the lowest in the second rotating bodies to the third rotating body; a support member for supporting the second rotating bodies and the third rotating body so as to be rotatable and capable of being arbitrarily eccentric in the radial direction; and a transmission mechanism for transmitting the rotational force of the third rotating body to the output shaft. In the above variable speed change gear, the second rotating bodies are arranged in an axial direction of the input shaft so that the movement direction with respect to the first rotating body is shifted so as to form equal angles with each other, with the input shaft being the center. Therefore, when the second rotating bodies and the third rotating body are made eccentric by an arbitrary amount, the angular velocities of the second rotating bodies change cyclically. The rotational force of the rotating body whose angular velocity is the highest or the lowest is transmitted to the third rotating body by the one-way transmission member, and then the rotational force of the third rotating body is transmitted to the output shaft. Thereby, the rotational speed of the output shaft is made higher or lower than that of the input shaft, so that the rotational speed of the output shaft is changed continuously in accordance with the eccentricity of the second rotating bodies. At this time, since each second rotating body moves straight in the radial direction with respect to the first rotating body, the angular velocities of the second rotating bodies changed cyclically by the eccentric rotation change so that the side on which the angular velocity is higher than the angular velocity of the input shaft and the side on which the angular velocity is lower are symmetrical to each other. Also, on both of the side on which the angular velocity is higher and the side on which it is lower, the acceleration side and the deceleration side change symmetrically to each other. On the other hand, the angular velocity of the second rotating body such that the movement direction with respect to the first rotating body is shifted so as to form equal angles with each other, with the input shaft being the center, changes symmetrically with respect to the angular velocity of the input shaft. Moreover, since the second rotating bodies have the same mass, the radial forces of the second rotating bodies are canceled each other. Consequently, the rotational force transmitted to the output shaft side always acts with the input and output shafts being the center.

According to a second aspect of the present invention, in the variable speed change gear of the first aspect of the invention, rotating shafts eccentric in the radial direction with respect to the input shaft are provided at both ends in the axial direction of the support member, and the support member is rotatably provided with the rotating shafts being the center. Therefore, in addition to the operation of the first aspect of the invention, the second rotating bodies are made eccentric by an arbitrary amount by rotating the support member with the rotating shaft being the center.

According to a third aspect of the present invention, in the variable speed change gear of the first aspect of the invention, the support member is formed into a cylindrical shape in which an outer peripheral surface is eccentric in the radial direction with respect to an inner peripheral surface thereof. The outer peripheral surface of the support member is rotatably supported by a circumferential surface eccentric in the radial direction with respect to the input shaft, and the inner peripheral surface of the support member rotatably supports the second rotating bodies and the third rotating body. Therefore, in addition to the operation of the first aspect of the invention, the second rotating bodies and the third rotating body are made eccentric with respect to the input shaft by an arbitrary amount by rotating the support member along the circumferential surface.

According to a fourth aspect of the present invention, in the variable speed change gear of the first, second, or third aspect of the invention, the transmission mechanism is configured so that the rotational force of the third rotating body is transmitted to the output shaft by being accelerated or decelerated. Therefore, in addition to the operation of the first, second, or third aspect of the invention, the rotational force changed by the eccentricity of the second rotating bodies is more greatly changed, and then is transmitted to the output shaft.

According to a fifth aspect of the present invention, in the variable speed change gear of the fourth aspect of the invention, the transmission mechanism includes a fourth rotating body rotated by the third rotating body, an internal gear rotating integrally with the input shaft, a gear rotating integrally with the output shaft, and a plurality of planetary gears which are rotatably supported by the fourth rotating body and mesh with the internal gear of the input shaft and the gear of the output shaft respectively. Therefore, in addition to the operation of the fourth aspect of the invention, the rotational speed of the output shaft side is increased or decreased in accordance with the amount of rotation of each planetary gear due to the difference in rotation between the input shaft and the fourth rotating body.

According to a sixth aspect of the present invention, in the variable speed change gear of the fourth aspect of the invention, the transmission mechanism includes a fourth rotating body rotated by the third rotating body, an internal gear rotating integrally with the fourth rotating body, a gear rotating integrally with the output shaft, and a plurality of planetary gears which are rotatably supported by the input shaft and mesh with the internal gear of the fourth rotating body and the gear of the output shaft respectively. Therefore, in addition to the operation of the fourth aspect of the invention, the rotational speed of the output shaft side is increased or decreased in accordance with the amount of rotation of each planetary gear due to the difference in rotation between the input shaft and the fourth rotating body.

Thereupon, according to the first, second, and third aspects of the present invention, the rotational force transmitted to the output shaft side can always be applied with the input and output shafts being the center. Moreover, since the rotational force can be transmitted uniformly, vibrations during its rotation can be prevented surely, and the variable speed change gear can satisfactorily be used in an application, such as an automobile, requiring large size and high rotation.

Also, according to the fourth, fifth, and sixth aspects of the present invention, in addition to the effect achieved by the first, second, and third aspects of the invention, the rotational force changed by the eccentric rotation can be changed more greatly, so that the variable speed change gear is advantageous in an application where the speed change width is wide.

DESCRIPTION OF THE PREFERRED EMBODIMENTS

FIGS. 1 to 9 show one embodiment of the present invention.

A variable speed change gear of this embodiment comprises a case 1 for housing the body, input-side and output-side shafts 2 and 3 arranged coaxially with each other, a total of three first rotors 4 rotating integrally with the input-side shaft 2, a total of six second rotors 5 whose rotational center is capable of being eccentric in the radial direction with respect to the rotational axis of the input-side shaft 2, a third rotor 6 whose rotational center is capable of being eccentric in the radial direction with respect to the rotational axis of the input-side shaft 2 together with the second rotors 5, one-way clutches 7 for transmitting only the rotational force in a predetermined direction of each of the second rotor 5 to the third rotor 6, a rotor case 8 for supporting the second rotors 5 and the third rotor 6 rotatably and so as to be capable of being eccentric, a variable mechanism 9 which makes the rotor case 8 eccentric arbitrarily, a fourth rotor 10 rotated by the third rotor 6, and a total of four planetary gears 11 rotatably supported by the fourth rotor 10. The output-side shaft 3 is rotated by the planetary gears 11.

Figure 1:
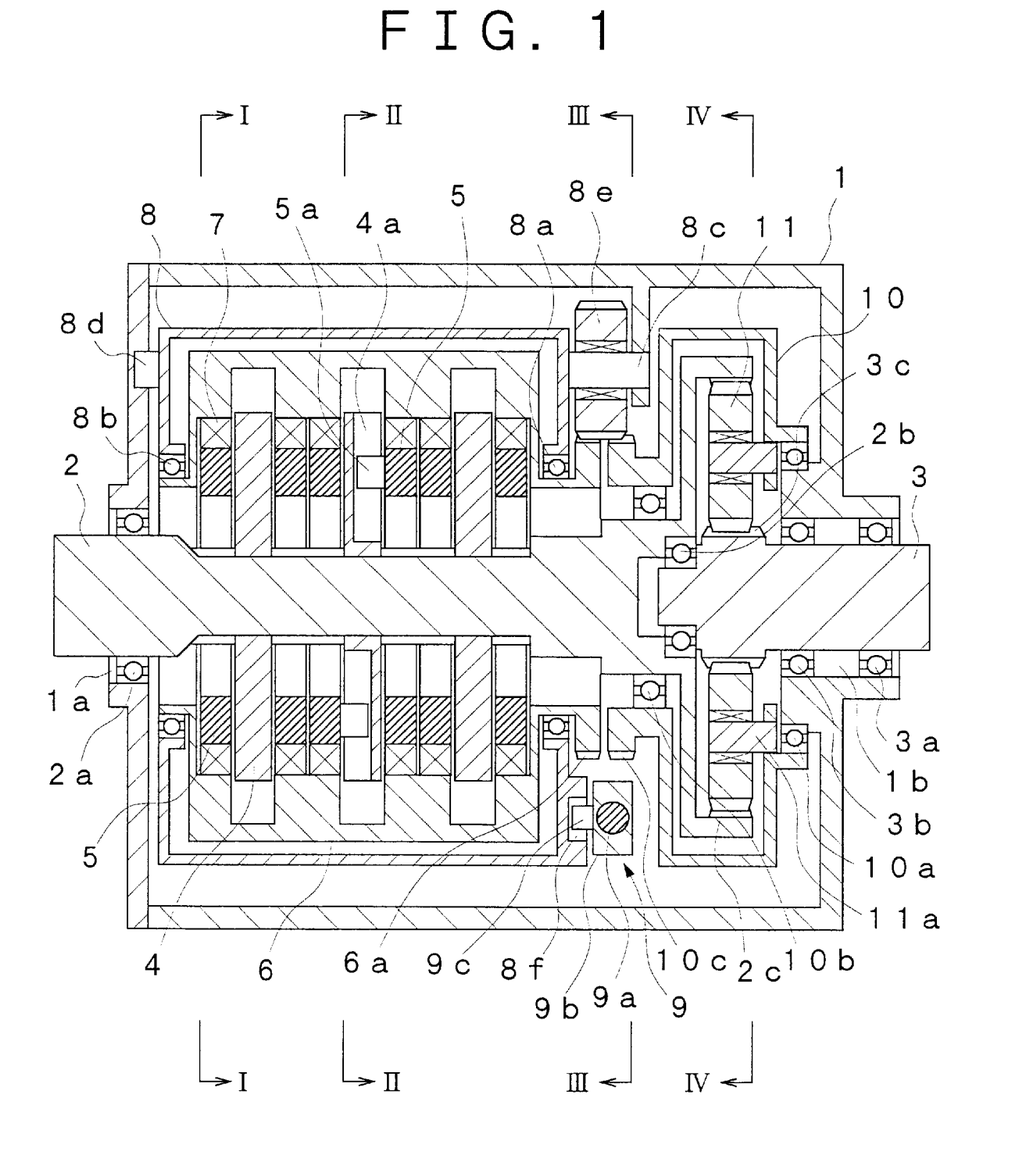
FIG. 1 is a side sectional view of a variable speed change gear in accordance with one embodiment of the present invention.
Figure 2:
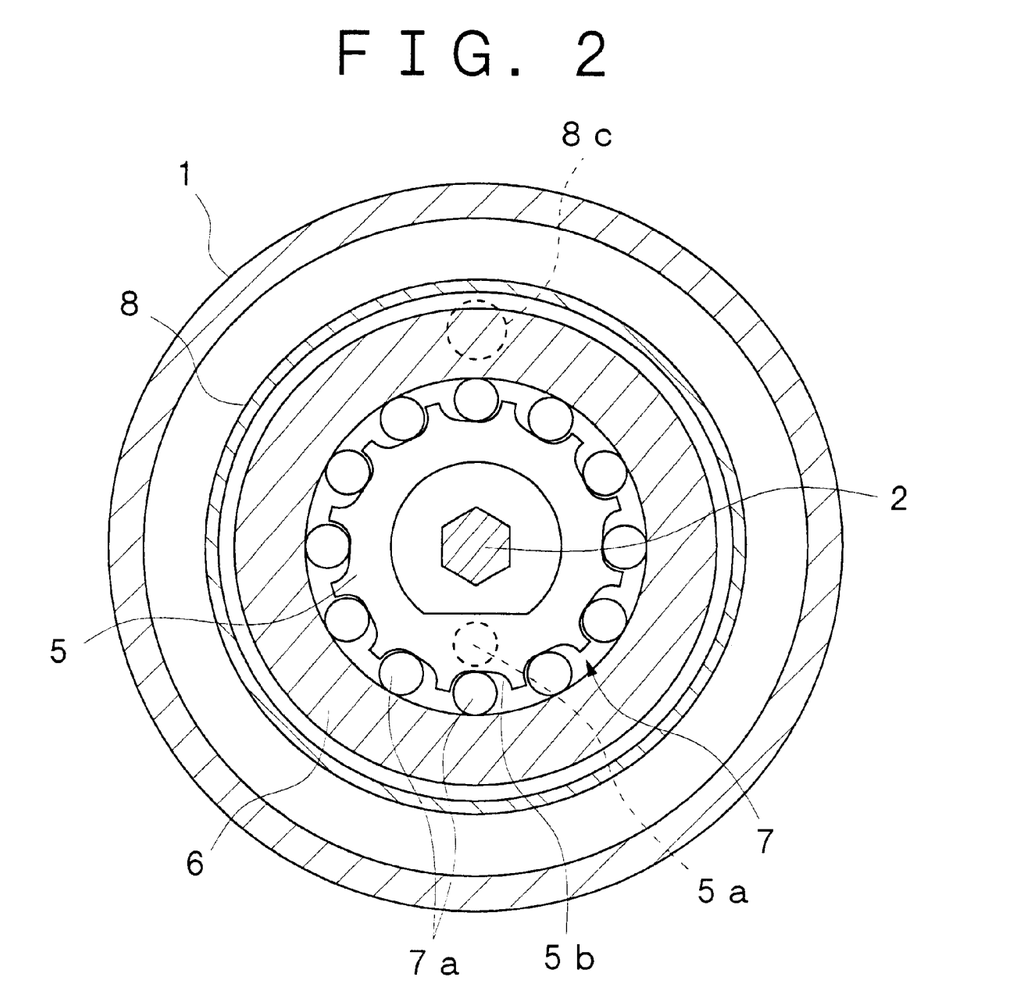
FIG. 2 is a sectional view taken along the line I—I of FIG. 1.
Figure 3:
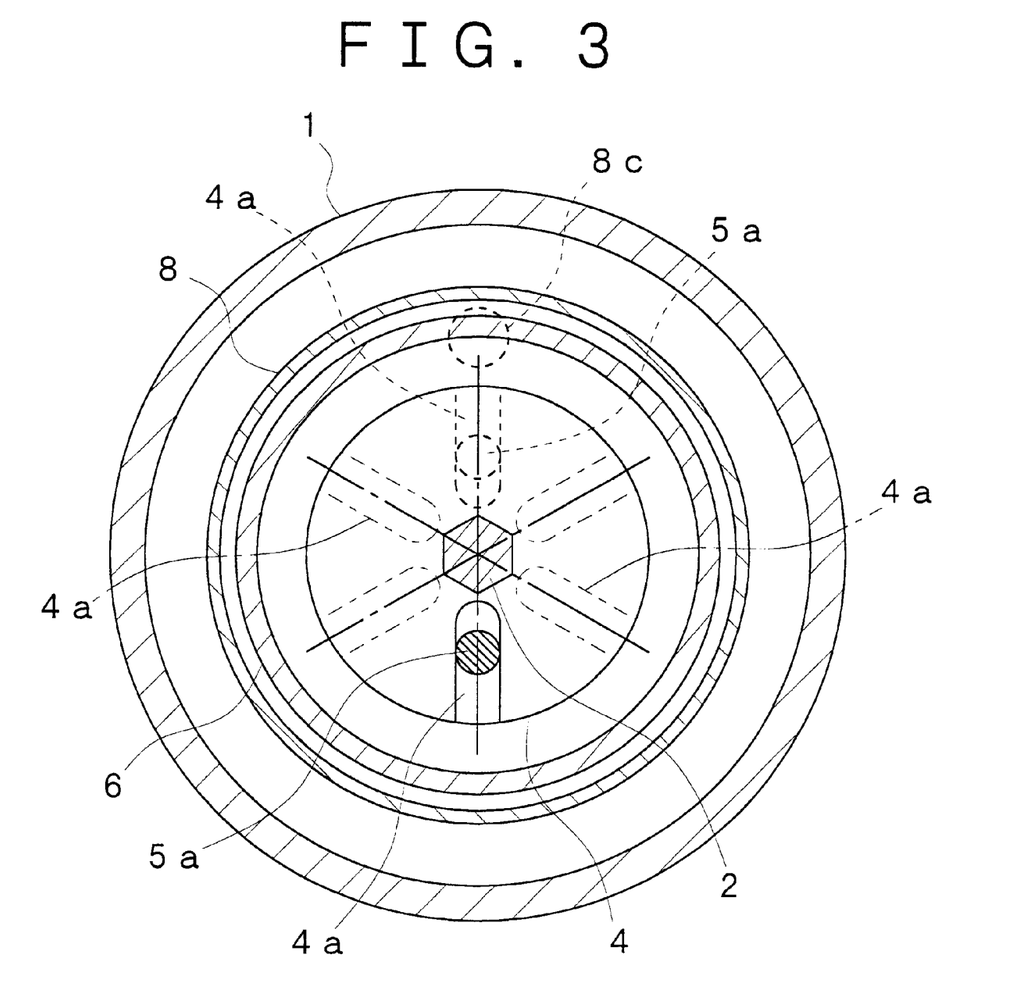
FIG. 3 is a sectional view taken along the line II—II of FIG. 1.
Figure 4:
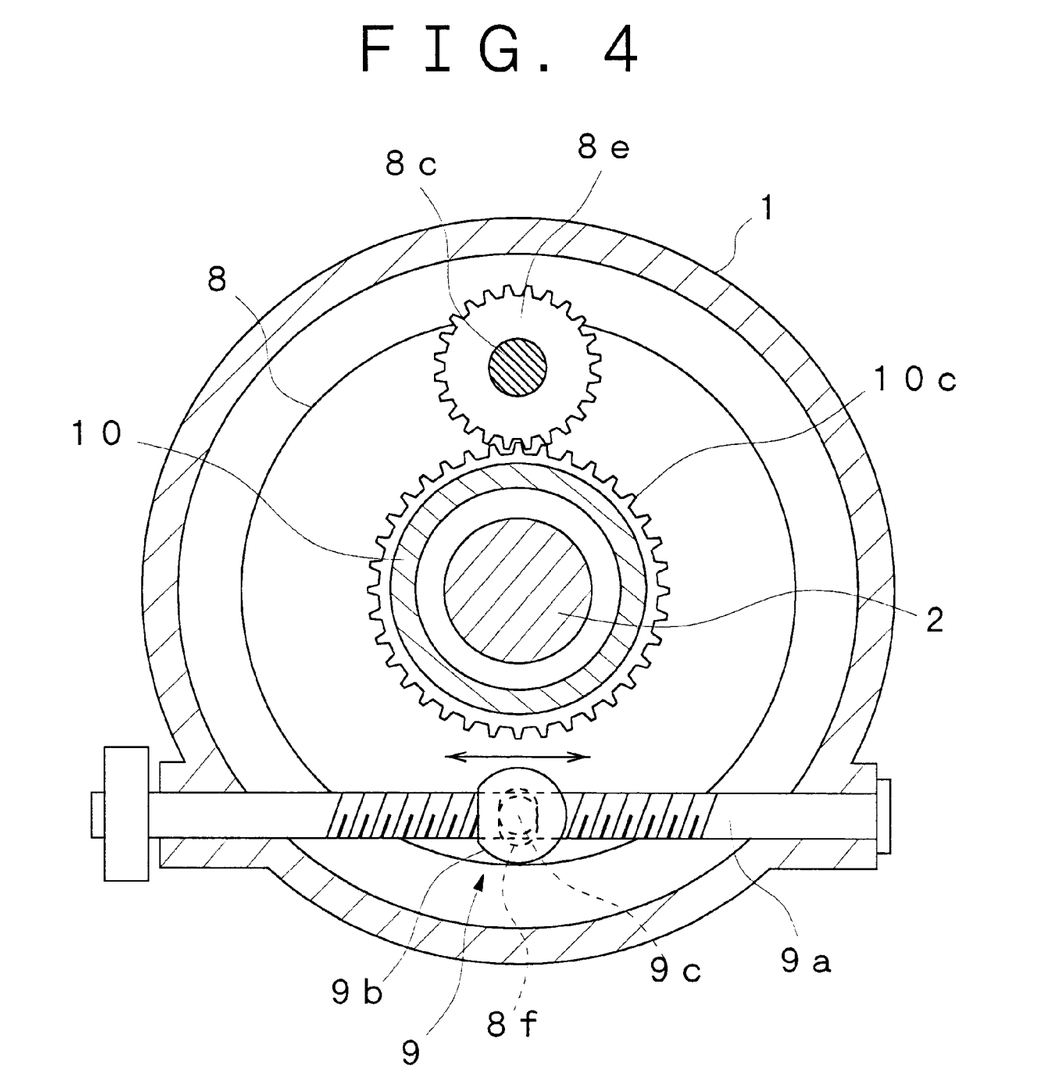
FIG. 4 is a sectional view taken along the line III—III of FIG. 1.
Figure 5:
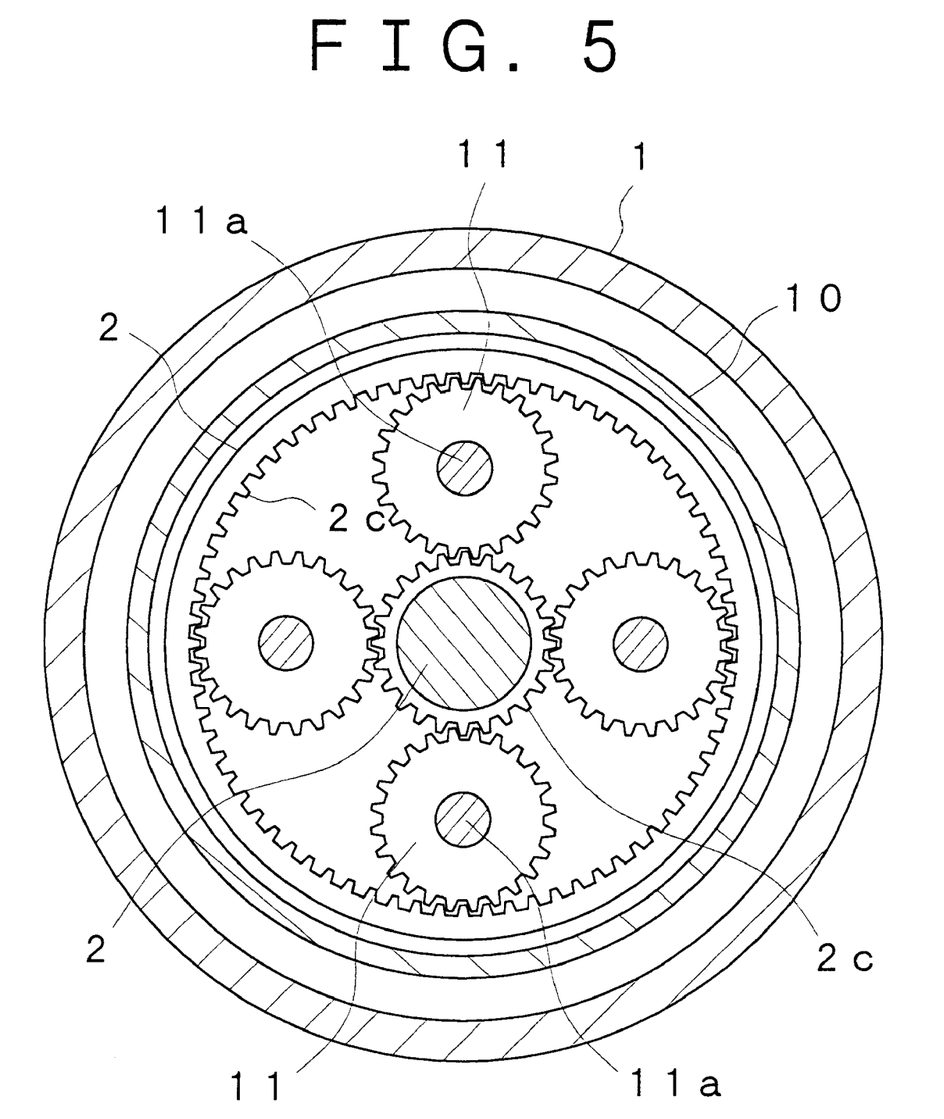
FIG. 5 is a sectional view taken along the line IV—IV of FIG. 1.

The case 1 is formed into a cylindrical shape. A supporting portion 1a for supporting the input-side shaft 2 is provided at one end in the axial direction of the case 1, and a supporting portion 1b for supporting the output-side shaft 3 is provided at the other end.

The input-side shaft 2 is rotatably supported by the supporting portion 1a of the case 1 via a bearing 2a at one end, and is rotatably supported by one end of the output-side shaft 3 via a bearing 2b at the other end. Also, an internal gear 2c meshing with the planetary gears 10 is provided at the other end of the input-side shaft 2.

The output-side shaft 3 is rotatably supported by a supporting portion 1b of the case 1 via bearings 3a and 3b, and a first gear 3c meshing with the planetary gears 11 is provided at its one end.

The first rotors 4 are arranged in the axial direction of the input-side shaft 2, and are rotated integrally with the input-side shaft 2. In this case, the connecting portion of the input-side shaft 2 and the first rotor 4 is formed into a hexagonal shape in cross section, and the rotation of the first rotor 4 with respect to the input-side shaft 2 is regulated. A straight groove 4a extending in the radial direction is formed on each end face in the axial direction of the first rotor 4. The grooves 4a in one first rotor 4 are formed so as to shift 180 degrees from each other with the rotational axis of the input-side shaft 2 being the center. In this case, the first rotors 4 are arranged in a direction such that the grooves 4a are shifted so as to form equal angles (60°) with each other with the rotational axis of the input-side shaft 2 being the center.

The second rotors 5 each are formed into an annular shape, and are arranged in the axial direction of the input-side shaft 2. In this case, second rotors 5 are arranged one by one on each side in the axial direction of one first rotor 4. One end face in the axial direction of the second rotor 5 is provided with a pin 5a extending in the axial direction, and the pin 5a of the second rotor 5 engages with the groove 4a in the first rotor 4 opposed to the second rotor 5 in the axial direction, so as to be movable in the radial direction. Also, a plurality of grooves 5b engaging with the one-way clutch 7 are provided on the outer peripheral surface of the second rotor 5 at equal intervals in the peripheral direction. The second rotors 5 are formed so as to have the same shape and mass.

The third rotor 6 is formed into a cylindrical shape, and the first rotors 4, the second rotors 5, and the one-way clutches 7 are arranged inside thereof. Also, at one end in the axial direction of the third rotor 6, a second gear 6a is provided to transmit the rotational force to the fourth rotor 10.

Figure 6A:
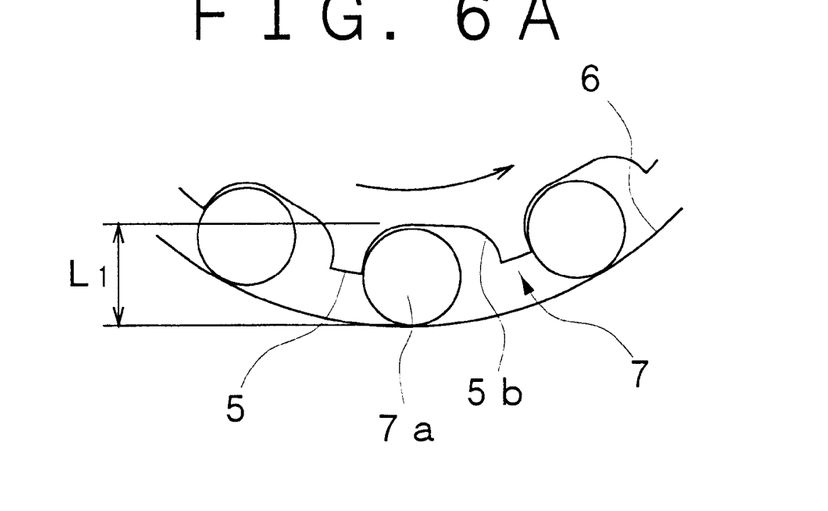
FIG. 6A is an enlarged view of a one-way clutch.
Figure 6B:
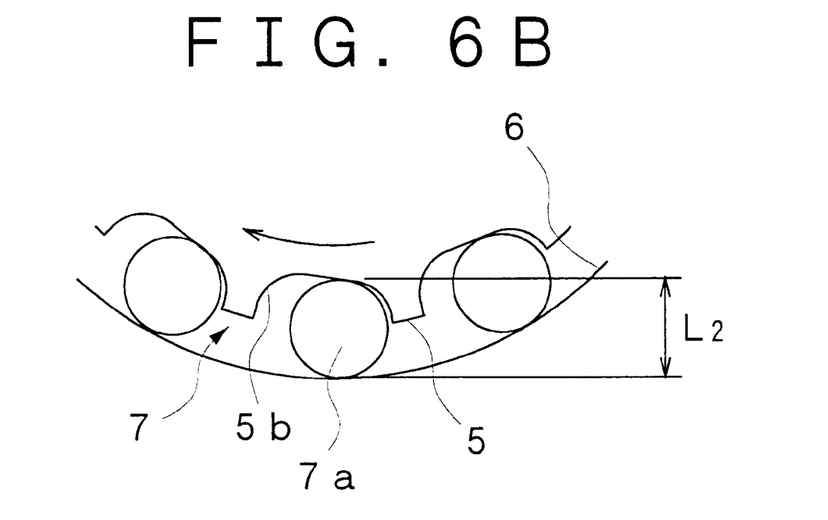
FIG. 6B is an enlarged view of a one-way clutch.

The one-way clutch 7 includes a plurality of rollers 7a arranged between the outer peripheral surface of the second rotor 5 and the inner peripheral surface of the third rotor 6, and each of the rollers 7a engages with the groove 5b of the second rotor 5. Specifically, as shown in FIG. 6, a gap L1 between one end in the peripheral direction of the groove 5b and the inner peripheral surface of the third rotor 6 is formed so as to be slightly larger than the outside diameter of the roller 7a, and a gap L2 between the other end in the peripheral direction of the groove 5b and the inner peripheral surface of the third roter 6 is formed so as to be slightly smaller than the outside diameter of the roller 7a. Thereby, when a rotational force is applied to the second rotor 5 in one direction with respect to the third rotor 6 as indicated by the solid-line arrow mark in FIG. 6A, the roller 7a is positioned at one end (a portion of gap L1) in the peripheral direction of the groove 5b, so that the roller 7a does not press the second rotor 5 and the third rotor 6, and therefore the rotational force of the second rotor 5 is not transmitted to the third rotor 6. When a rotational force is applied to the second rotor 5 in the other direction with respect to the third rotor 6 as indicated by the solid-line arrow mark in FIG. 6B, the roller 7a is positioned at the other end (a portion of gap L2) in the peripheral direction of the groove 5b, so that the roller 7a presses the second rotor 5 and the third rotor 6, by which the rotational force is transmitted to the third rotor 6.

The rotor case 8 is formed into a cylindrical shape in which the peripheral edge side of each end face is closed, and the third rotor 6 is arranged therein. In this case, each of the axial ends of the third rotor 6 is rotatably supported by the rotor case 8 via bearings 8a and 8b. Each end face of the rotor case 8 is provided with shafts 8c and 8d which are eccentric with respect to the rotational axis of the input-side shaft 2, and the shafts 8c and 8d are rotatably supported by the case 1. In this case, one shaft 8c is rotatably fitted with a third gear 8e meshing with the second gear 6a. Also, one end face of the rotor case 8 is formed with a hole 8f engaging with the variable mechanism 9 at a position close to the outer end in the radial direction.

The variable mechanism 9 includes a shaft 9a rotatably supported by the case 1 and an engagement member 9b fitted to the shaft 9a. The engagement member 9b is provided with a pin 9c engaging with the hole 8f in the rotor case 8. Specifically, the shaft 9a and the engagement member 9b are threadedly engaged with each other, so that the engagement member 9b is moved in the axial direction of the shaft 9a by the rotation of the shaft 9a, and thereby the rotor case 8 engaging with the engagement member 9b is turned around the shafts 8c and 8d.

The fourth rotor 10 is rotatably supported by the case 1 via a bearing 10a at one end in the axial direction, and is rotatably supported by the other end of the input-side shaft 2 via a bearing 10b at the other end in the axial direction. Also, a fourth gear 10c meshing with the third gear 8e is provided at the other end in the axial direction of the fourth rotor 10.

The planetary gears 11 are rotatably supported by the other end in the axial direction of the fourth rotor 10 via a shaft 11a, and mesh with the internal gear 2c of the input-side shaft 2 and the first gear 3c of the output-side shaft 3.

In the variable speed change gear constructed as described above, when the input-side shaft 2 is rotated by an external driving force, the rotational force of the input-side shaft 2 is transmitted to each of the first rotors 4, and the rotational force of the first rotor 4 is transmitted to each of the second rotors 5 via the pin 5a of the second rotor 5 engaging with the groove 4a. Next, the rotational force of the second rotor 5 is transmitted to the third rotor 6 by the one-way clutch 7, and the rotational force of the third rotor 6 is transmitted to the fourth rotor 10 via the second gear 6a, the third gear 8e, and the fourth gear 10c. Also, the rotational force of the fourth rotor 10 is transmitted to each of the planetary gears 11, so that the planetary gear 11 revolves while meshing with the internal gear 2c of the input-side shaft 2 and the first gear 3c, and the rotational force of the planetary gear 11 is transmitted to the output-side shaft 3.

Figure 7:
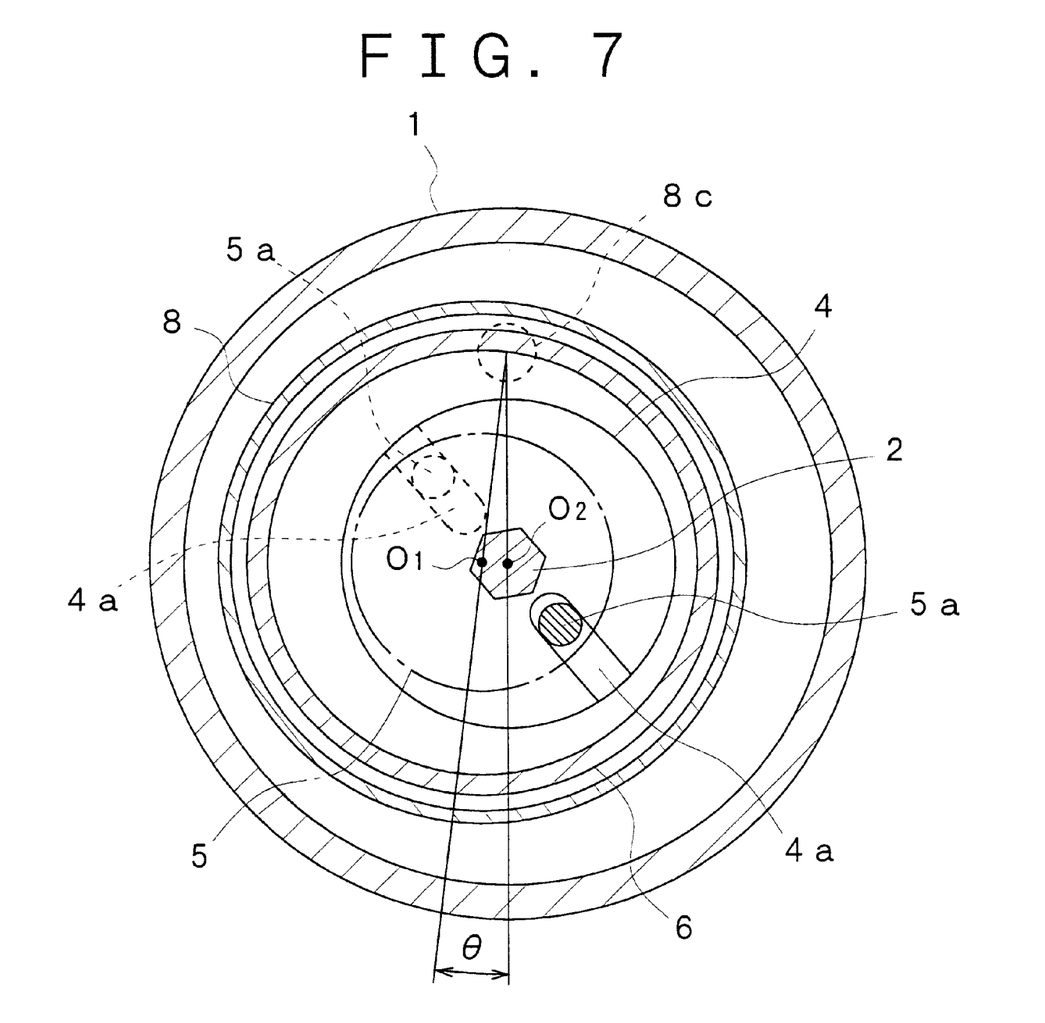
FIG. 7 is an explanatory view for the operation of a variable speed change gear.
Figure 8:
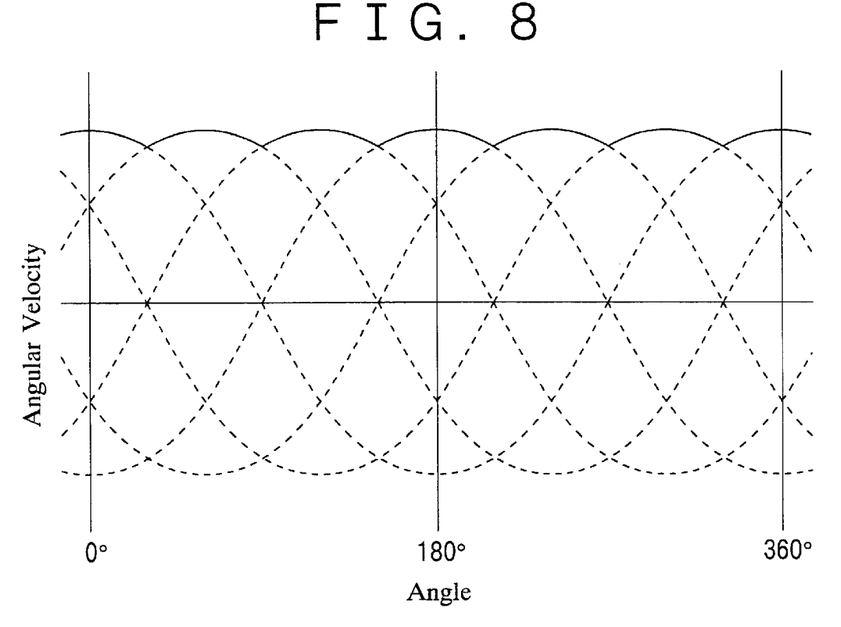
FIG. 8 is a diagram showing a change of angular velocity of a second rotor.

Next, when the shaft 9a of the variable mechanism 9 is rotated by an arbitrary amount, as shown in FIG. 7, the rotor case 8 becomes eccentric with respect to the rotational axis of the input-side shaft 2. Thereby, the rotational center O1 of the second rotor 5 becomes eccentric in the radial direction by an angle θ around the center of the shaft 8c, 8d with respect to the rotational center O2 of the first rotor 4, so that each of the angular velocities of the second rotors 5 changes cyclically, and the rotational force of the second rotor 5 whose angular velocity is the highest (the solid line portion in FIG. 8) is transmitted to the third rotor 6 by the one-way clutch 7. Thereby, the rotational speed of the fourth rotor 10 becomes higher than that of the input-side shaft 2, and further the rotation of the planetary gear 11 due to a difference in rotation between the fourth rotor 10 and the input-side shaft 2 is produced, so that the rotational speed of the output-side shaft 3 becomes higher than that of the input-side shaft 2 by the degree of the difference in rotation between the fourth rotor 10 and the input-side shaft 2 and the degree of the rotation of the planetary gears 11. Therefore, the rotational speed of the output-side shaft 3 can be changed continuously with respect to the input-side shaft 2 in accordance with the eccentricity of the rotor case 8. In this case, the speed increasing ratio due to the rotation of the planetary gears 11 can be arbitrarily set by changing the gear ratio between the planetary gear 11 and the gear 3c of the output-side shaft 3.

Figure 9:
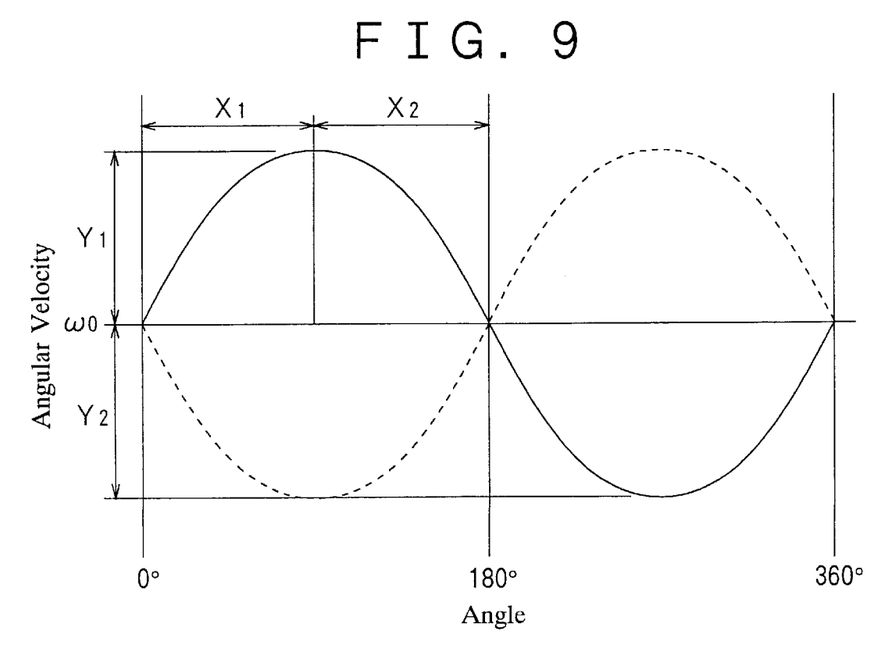
FIG. 9 is a diagram showing a change of angular velocity of a second rotor.

Since the groove 4a of the first rotor 4 engaging with the pin 5a of the second rotor 5 is formed straight in the radial direction, the angular velocities of the second rotors 5 changed cyclically by the eccentric rotation change so that, as shown in FIG. 9, the side Y1 on which the angular velocity is higher than the angular velocity ω0 of the input-side shaft 2 and the side Y2 on which the angular velocity is lower are symmetrical to each other. Also, on both of the side Y1 on which the angular velocity is higher and the side Y2 on which it is lower, the acceleration side X1 and the deceleration side X2 change symmetrically to each other. On the other hand, since the movement direction of the pin 5a shifts 180 degrees from each other around the rotational axis of the input-side shaft 2 in the groove 4a on one end face of the first rotor 4 and the groove 4a on the other end face thereof, the angular velocity of one second rotor 5 engaging with one first rotor 4 (the waveform indicated by the solid line in FIG. 9) and the angular velocity of the other second rotor 5 engaging with the same first rotor 4 (the waveform indicated by the broken line in FIG. 9) change symmetrically with respect to the angular velocity ω0 of the input-side shaft 2. Moreover, since the second rotors 5 have the same mass, the radial forces of the second rotors 5 engaging with one first rotor 4 are canceled each other, so that the rotational force transmitted to the side of the third rotor 6 always acts with the rotational axis of the input-side shaft 2 being the center. Also, since the first rotors 4 are arranged so that the grooves 4a are shifted so as to form equal angles with each other with the rotational axis of the input-side shaft 2 being the center, the rotational force of the second rotor 5 engaging with the first rotor 4 is transmitted uniformly.

Thus, according to the variable speed change gear of this embodiment, even if the construction is such that speed is changed by making the second rotors 5 eccentric in the radial direction with respect to the rotational axis of the input-side shaft 2, the rotational force transmitted from the second rotor 5 to the third rotor 6 can always be applied with the rotational axis of the input-side shaft 2 being the center. Moreover, since the rotational force of the second rotor 5 can be transmitted uniformly, the occurrence of vibration during its rotation can be prevented surely, and consequently, the transmission can satisfactorily be used in an application requiring large size and high rotation.

Although the transmission having a speed increasing mechanism using the planetary gears 11 has been described in the above embodiment, such a speed increasing mechanism can be omitted, and the rotational force of the fourth rotor 10 may be transmitted directly to the output-side shaft 3.

Figure 10:
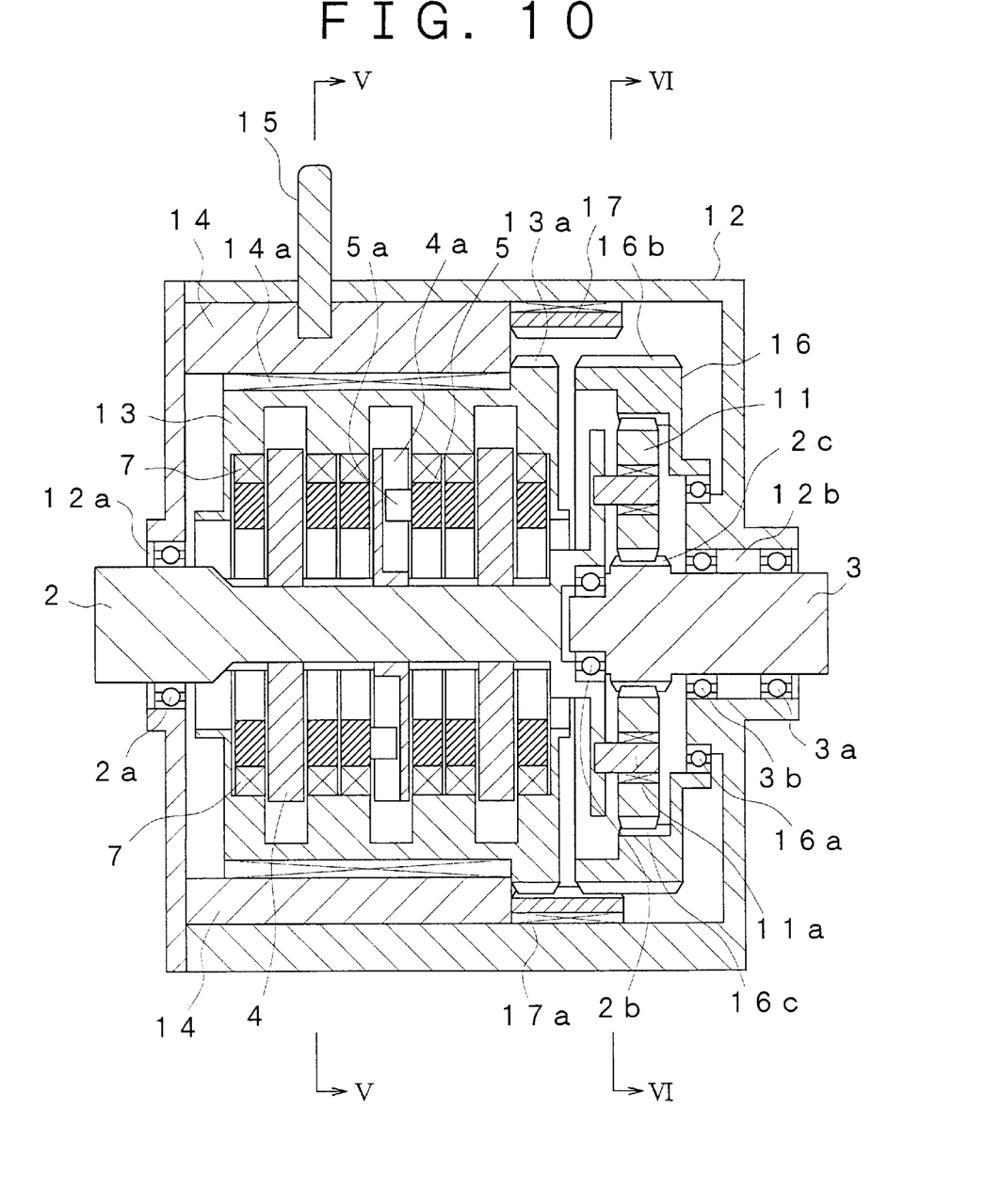
FIG. 10 is a side sectional view of a variable speed change gear in accordance with another embodiment of the present invention.
Figure 11:
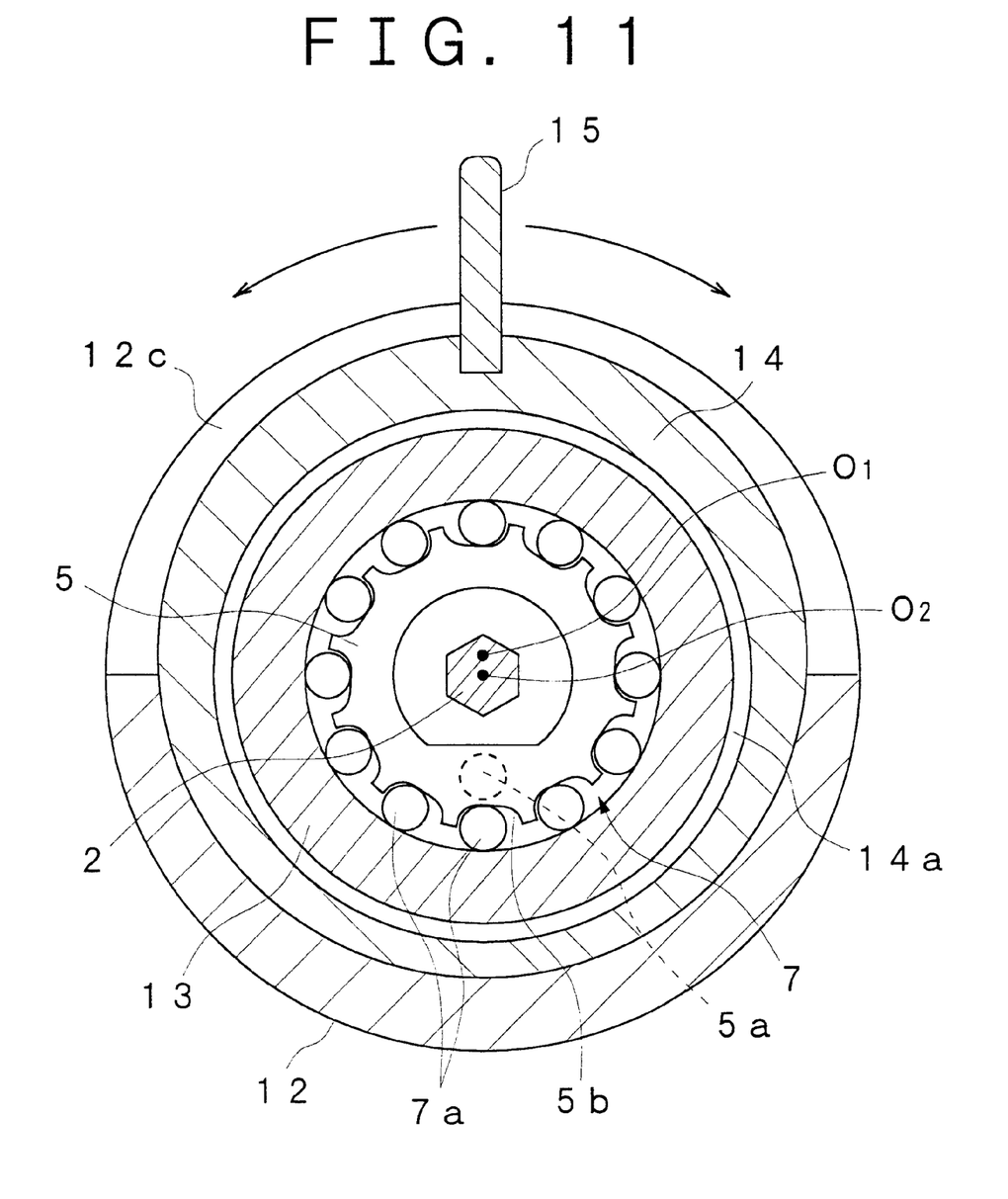
FIG. 11 is a sectional view taken along the line V—V of FIG. 10.
Figure 12:
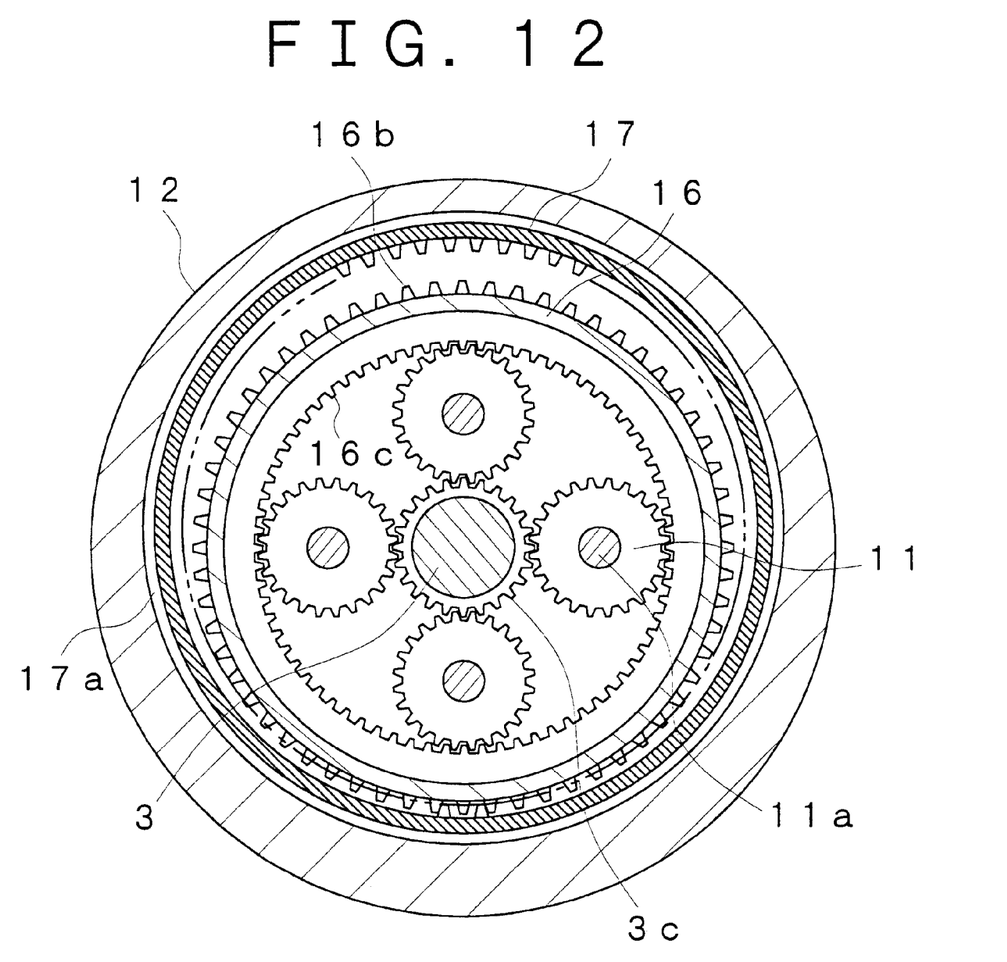
FIG. 12 is a sectional view taken along the line VI—VI of FIG. 10.

FIGS. 10 to 12 show another embodiment of the present invention. FIG. 10 is a side sectional view of a variable speed change gear, FIG. 11 is a sectional view taken along the line V—V of FIG. 10, and FIG. 12 is a sectional view taken along the line VI—VI of FIG. 10. In this embodiment, the same reference numerals are applied to elements which are essentially the same as the elements of the above-described embodiment, and the detailed description of these elements is omitted.

The variable speed change gear of this embodiment comprises a case 12 for housing the body, input-side and output-side shafts 2 and 3 arranged coaxially with each other, a total of three first rotors 4 rotating integrally with the input-side shaft 2, a total of six second rotors 5 whose rotational center is capable of being eccentric in the radial direction with respect to the rotational axis of the input-side shaft 2, a third rotor 13 whose rotational center is capable of being eccentric in the radial direction with respect to the rotational axis of the input-side shaft 2 together with the second rotors 5, one-way clutches 7 for transmitting only the rotational force in a predetermined direction of each of the second rotor 5 to the third rotor 13, a rotor holder 14 for supporting the second rotors 5 and the third rotor 13 so as to be rotatable and capable of being eccentric, a variable lever 15 for making the rotor holder 14 eccentric arbitrarily, a fourth rotor 16 rotated by the third rotor 13, a total of four planetary gears 11 rotatably supported by the fourth rotor 16, and a ring gear 17 meshing with the third rotor 13 and the fourth rotor 16. The output-side shaft 3 is rotated by the planetary gears 11. In this embodiment, the transmission direction of the one-way clutch 7 is set in the direction opposite to the above-described embodiment so that the rotational force of the second rotor 5 whose angular velocity is the lowest is transmitted to the output side.

The case 12 is formed into a cylindrical shape, in which the inner peripheral surface is eccentric in the radial direction with respect to the outer peripheral surface. A supporting portion 12a for supporting the input-side shaft 2 is provided at one end in the axial direction of the case 12, and a supporting portion 12b for supporting the output-side shaft 3 is provided at the other end. Also, an elongated hole 12c extending in the peripheral direction is formed on the outer peripheral surface of the case 12, and the variable lever 15 is inserted in the elongated hole 12c.

The third rotor 13 is formed into a cylindrical shape, and the first rotors 4, the second rotors 5, and the one-way clutches 7 are arranged inside thereof. Also, a second gear 13a is provided on the outer peripheral surface at one end in the axial direction of the third rotor 13 in order to transmit the rotational force to the fourth rotor 16.

The rotor holder 14 is formed into a cylindrical shape, in which the outer peripheral surface consisting of the circumferential surface is eccentric in the radial direction with respect to the center of the inner peripheral surface, and the outer peripheral surface thereof is rotatably supported by the inner peripheral surface of the case 12. Also, the third rotor 13 is arranged in the rotor holder 14, and the third rotor 13 is rotatably supported by the inner peripheral surface of the rotor holder 14 via a bearing 14a.

The variable lever 15 is connected to the rotor holder 14 through the elongated hole 12c in the case 12, so that the rotor holder 14 can be turned to an arbitrary rotation position by turning the variable lever 15 along the elongated hole 12c.

The fourth rotor 16 is rotatably supported by the case 12 via a bearing 16a at one end in the axial direction, and is provided with a third gear 16b meshing with the ring gear 17 on the outer peripheral surface at the other end in the axial direction. Also, an internal gear 16c meshing with the planetary gears 11 is provided on the inner peripheral surface at the other end in the axial direction of the fourth rotor 16, and the planetary gears 11 are rotatably supported by the other side of the input-side shaft 2.

The ring gear 17 is rotatably supported by the inner peripheral surface of the case 12 via a bearing 17a, and the second gear 13a of the third rotor 13 and the third gear 16c of the fourth rotor 16 mesh with an internal gear of the ring gear 17.

In the variable speed change gear constructed as described above, when the input-side shaft 2 is rotated by an external driving force, the rotational force of the input-side shaft 2 is transmitted to each of the first rotors 4, and the rotational force of the first rotor 4 is transmitted to each of the second rotors 5 via the pin 5a of the second rotor 5 engaging with the groove 4a. Next, the rotational force of the second rotor 5 is transmitted to the third rotor 13 by the one-way clutch 7, and the rotational force of the third rotor 13 is transmitted to the fourth rotor 16 via the second gear 13*a*, the ring gear 17, and the third gear 16*b*. Also, the rotational force of the input-side shaft 2 is transmitted to each of the planetary gears 11, so that the planetary gear 11 revolves while meshing with the internal gear 16*c* of the fourth rotor 16 and the first gear 3*c*, and the rotational force of the planetary gear 11 is transmitted to the output-side shaft 3.

Next, when the rotor holder 14 is turned by an arbitrary amount by the variable lever 15, the center of the inner peripheral surface of the rotor holder 14 becomes eccentric with respect to the rotational axis of the input-side shaft 2. Therefore, since the rotational center O1 of the second rotor 5 becomes eccentric in the radial direction with respect to the rotational center O2 of the first rotor 4, like the firstly-described embodiment, each of the angular velocities of the second rotors 5 changes cyclically, so that the rotational speed of the output-side shaft 3 can be changed continuously with respect to the input-side shaft 2 in accordance with the eccentricity of the rotor holder 14.

What is claimed is:

1. A variable speed change gear comprising:

an input shaft and an output shaft arranged coaxially with each other;

a plurality of first rotating bodies which rotate integrally with the input shaft;

a plurality of second rotating bodies having an equal mass, each of which engages with the first rotating body so as to be movable straight in the radial direction, and in which the rotational center can become eccentric in the radial direction with respect to the input shaft;

a third rotating body in which the rotational center can become eccentric in the radial direction with respect to the input shaft together with the second rotating bodies;

a one-way transmission member for transmitting a rotational force in a predetermined direction of the rotating body whose angular velocity is the highest or the lowest in the second rotating bodies to the third rotating body;

a support member for supporting the second rotating bodies and the third rotating body so as to be rotatable and capable of being eccentric arbitrarily in the radial direction; and a transmission mechanism for transmitting a rotational force of the third rotating body to the output shaft, characterized in that the second rotating bodies are arranged so that the movement direction with respect to the first rotating body is shifted so as to form equal angles with each other with the input shaft being the center.

2. The variable speed change gear according to claim 1, wherein rotating shafts eccentric in the radial direction with respect to the input shaft are provided at both ends in the axial direction of the support member, and the support member is rotatably provided with the rotating shafts being the center.

3. The variable speed change gear according to claim 2, wherein the transmission mechanism is configured so that the rotational force of the third rotating body is transmitted to the output shaft by accelerating or decelerating.

4. The variable speed change gear according to claim 1, wherein the support member is formed into a cylindrical shape in which an outer peripheral surface is eccentric in the radial direction with respect to an inner peripheral surface; the outer peripheral surface of the support member is rotatably supported by a circumferential surface eccentric in the radial direction with respect to the input shaft; and the inner peripheral surface of the support member rotatably supports the second rotating bodies and the third rotating body.

5. The variable speed change gear according to claim 4, wherein the transmission mechanism is configured so that the rotational force of the third rotating body is transmitted to the output shaft by accelerating or decelerating.

6. The variable speed change gear according to claim 1, wherein the transmission mechanism is configured so that the rotational force of the third rotating body is transmitted to the output shaft by accelerating or decelerating.

7. The variable speed change gear according to claim 6, wherein the transmission mechanism includes a fourth rotating body rotated by the third rotating body, an internal gear rotating integrally with the input shaft, a gear rotating integrally with the output shaft, and a plurality of planetary gears which are rotatably supported by the fourth rotating body and mesh with the internal gear of the input shaft and the gear of the output shaft respectively.

8. The variable speed change gear according to claim 6, wherein the transmission mechanism includes a fourth rotating body rotated by the third rotating body, an internal gear rotating integrally with the fourth rotating body, a gear rotating integrally with the output shaft, and a plurality of planetary gears which are rotatably supported by the input shaft and mesh with the internal gear of the fourth rotating body and the gear of the output shaft respectively.

* * * * *